March 4, 1924.
C. H. BANKHEAD
SHOCK ABSORBER
Original Filed Oct. 28, 1919
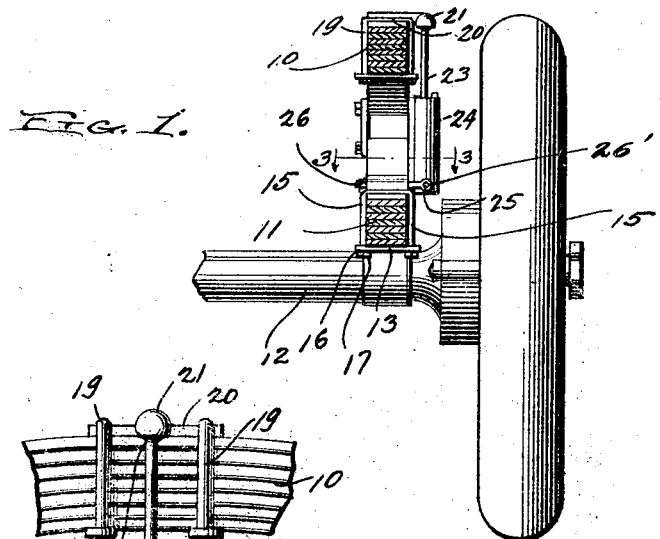
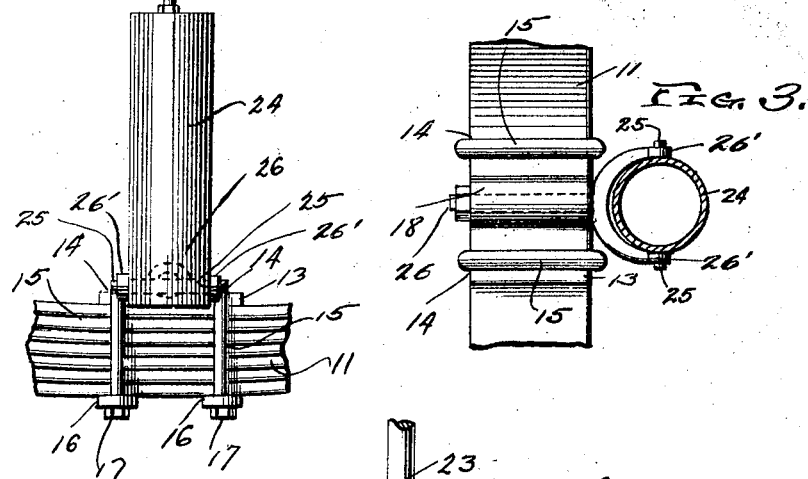
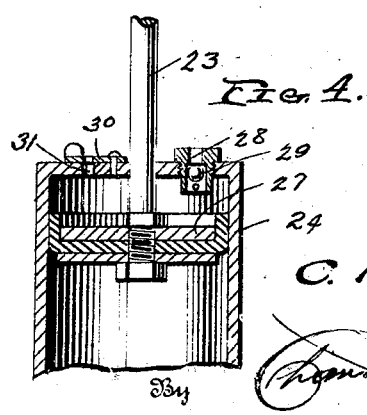
Inventor
C. H. Bankhead
By
Attorneys Patented Mar. 4, 1924.

1,486,005

UNITED STATES PATENT OFFICE.

CHARLES H. BANKHEAD, OF ELKINS, WEST VIRGINIA.

SHOCK ABSORBER.

Application filed October 28, 1919, Serial No. 333,904. Renewed January 21, 1924.

*To all whom it may concern:*

Be it known that I, CHARLES H. BANKHEAD, a citizen of the United States, residing at Elkins, in the county of Randolph, State of West Virginia, have invented certain new and useful Improvements in Shock Absorbers; and I do hereby declare the following to be a full, clear, and exact description of the invention, such as will enable others skilled in the art to which it appertains to make and use the same.

This invention relates to new and useful improvements in shock absorbers and particularly to shock absorbers for use on vehicles.

One object of the present invention is to provide a novel and improved device of this character which will permit movement in all directions under the varying motions of the springs of the vehicle.

Another object is to provide a novel and improved shock absorber which can be easily and quickly attached to the springs of any of the automobiles now in use, without modifications or alterations to the axle or springs.

Other objects and advantages will be apparent from the following description when taken in connection with the accompanying drawing.

In the drawing:

Figure 1 is an elevation of the shock absorber viewed from the rear of the automobile, the springs being shown in section.

Figure 2 is a side elevation of the shock absorber, portions of the springs being shown in elevation.

Figure 3 is a horizontal sectional view taken on the line 3—3 of Figure 1, through the cylinder and just above the clip of the lower spring.

Figure 4 is a vertical sectional view through the upper portion of the cylinder showing the air inlet and outlet ports.

Referring particularly to the accompanying drawing, 10 represents the upper spring and 11 the lower spring of one end of the axle 12 of the vehicle.

Disposed on the upper face of the lower spring, adjacent the axle, is a metal plate 13 having the transverse grooves 14 in the forward and rearward portions of its upper face for the reception of the bight portions of the U-bolts 15, whose legs depend at the sides of the spring and receive thereon the washers 16 and nuts 17. Formed centrally on the upper face of the plate, and extending transversely thereof, is a longitudinally bored enlargement 18.

Secured to the upper spring by U-bolts 19, of similar construction and arrangement to those of the lower plate, is a plate 20 which projects outwardly beyond the outer side of the spring and is formed with a spherical socket 21 for the reception of the ball head 22 of the piston rod 23 of the air cushion cylinder 24. The lower end of this cylinder has formed thereon the opposite radial lugs 25 which are received in the eyes 26 of the arms of the forked portion of the bolt 26, said bolt being also engaged in the bore of the enlargement. Thus the cylinder is permitted free play as the spring flexes up and down. The piston rod 23 has a head 27 which moves up and down in the cylinder, the lower end of the cylinder being open, while the upper end is formed with an air inlet opening of considerable diameter, as shown at 28, and in which is mounted an inwardly opening valve 29. In the head of the cylinder there is also formed a very small pin opening 31 through which the air drawing into the cylinder through the valved opening is forced to exhaust very slowly, thereby retarding the upward movement of the piston after having been depressed within the cylinder.

Pivotally mounted on the head of the cylinder is a plate 30 which is arranged to be swung over the pin opening to regulate the size thereof for the purpose of regulating the speed of return of the piston to normal elevated position.

What is claimed is:

In a shock absorber for a vehicle, the combination with the upper and lower springs of the vehicle, of a clip plate for the upper spring having a lateral extension formed with a socket, a clip plate for the lower spring, a transversely bored boss, a cylinder having a piston therein, the rod of the piston having a ball movably held in the said socket, and a stem rotatably retained in the said boss transversely of the spring and having a forked outer end embracing the cylinder and having its arms pivotally connected thereto—the last-named pivots being disposed in a plane at right angles to that of the stem.

In testimony whereof, I affix my signature, in the presence of two witnesses.

CHARLES H. BANKHEAD.

Witnesses:
 Ro Harding,
 Vie Harding Weir.